United States Patent [19]
Trader et al.

[11] Patent Number: 5,909,670
[45] Date of Patent: Jun. 1, 1999

[54] METHOD AND SYSTEM FOR PLAYBACK OF ADVERTISEMENTS IN AN ELECTRONIC CLASSIFIED ADVERTISING SYSTEM

[75] Inventors: Terry F. Trader, Castle Rock; Leslie Darrell Cox, Arvada, both of Colo.

[73] Assignees: U S West, Inc., Denver; MediaOne Group, Inc., Englewood, both of Colo.

[21] Appl. No.: 08/584,415

[22] Filed: Jan. 9, 1996

Related U.S. Application Data

[63] Continuation of application No. 08/370,065, Jan. 9, 1995, Pat. No. 5,745,882.
[51] Int. Cl.⁶ .............................. G06F 17/60; G06F 17/40
[52] U.S. Cl. .................................. 705/14; 705/7; 705/26; 379/88.24; 379/93.12
[58] Field of Search .................................. 705/1, 26, 27, 705/14, 7, 10; 379/67.68, 88, 89, 265, 93.12, 93.27, 71, 88.24

[56] References Cited

U.S. PATENT DOCUMENTS

| | | | |
|---|---|---|---|
| 4,602,129 | 7/1986 | Matthews et al. | 379/88 |
| 5,187,735 | 2/1993 | Garcia et al. | 379/88 |
| 5,193,110 | 3/1993 | Jones et al. | 379/93.14 |
| 5,249,044 | 9/1993 | Von Kohorn | 348/12 |
| 5,283,731 | 2/1994 | Lalonde et al. | 705/1 |
| 5,361,295 | 11/1994 | Solomon et al. | 379/67 |
| 5,412,416 | 5/1995 | Nemirofsky | 348/10 |
| 5,412,720 | 5/1995 | Hoarty | 380/15 |
| 5,438,355 | 8/1995 | Palmer | 348/1 |
| 5,438,615 | 8/1995 | Moen | 379/144 |
| 5,448,625 | 9/1995 | Lederman | 379/67 |
| 5,481,296 | 1/1996 | Cragun et al. | 348/13 |
| 5,592,375 | 1/1997 | Salmon et al. | 705/7 |

*Primary Examiner*—Joseph Thomas
*Attorney, Agent, or Firm*—Brooks & Kushman

[57] ABSTRACT

A method and system for manipulating playback of advertisements selected from an electronic classified advertising system. The method includes advancing playback an advertisement a first predetermined period of time in response to a first user input, and retreating playback of an advertisement a second predetermined period of time in response to a second user input. The method also includes pausing playback an advertisement in response to a third user input, and resuming playback of the paused advertisement upon the expiration of a third predetermined period of time. The system includes input and output devices, a processor, memory, and software for performing the method.

8 Claims, 17 Drawing Sheets

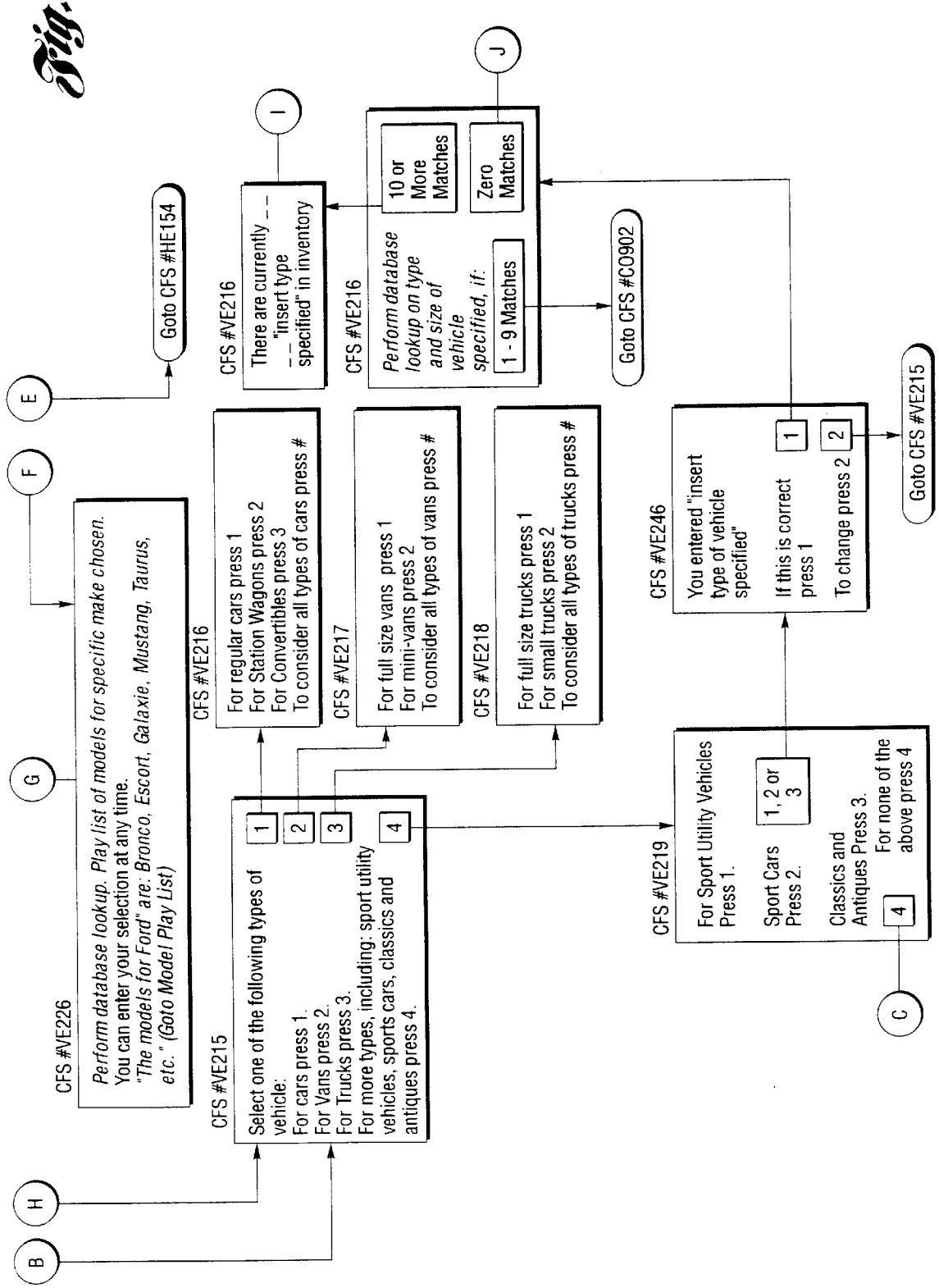

METHOD AND SYSTEM FOR PLAYBACK OF ADVERTISEMENTS IN AN ELECTRONIC CLASSIFIED ADVERTISING SYSTEM

CROSS REFERENCE TO RELATED APPLICATION

This application is a continuation of U.S. patent application Ser. No. 08/370,065 filed Jan. 9, 1995, now U.S. Pat. No. 5,745,882, entitled "Electronic Classified Advertising Interface Method And Instructions With Continuous Search Notification".

TECHNICAL FIELD

This invention relates to a method and system for manipulating playback of a plurality of advertisements selected from an electronic classified advertising system.

BACKGROUND ART

Classified advertising has been utilized by the print media for many years. In particular, newspapers and magazines utilize this device to generate revenue from individuals or other relatively small sellers who could otherwise not afford to advertise goods and services they wish to sell. Classified advertising has also served buyers in allowing them access to goods or services from these individuals or small sellers. Classified advertising is also used by large volume sellers to reach users who look to such advertising for items such as homes or automobiles. Thus, classified advertising has proven very useful over the years in bringing buyers and sellers together.

Some publications such as newspapers have attempted to augment their printed classified advertising by offering telephonic electronic classified advertising. Electronic classified ads are intended to allow sellers of goods and services the ability to augment their print ad with an audio ad. Electronic classified advertising may solve many needs that are currently unmet by print ads alone. For example, the potential buyer can hear more detail about the product or service being offered than is included in the printed ad. Thus, the buyer is able to hear more detail without having to talk directly to the seller. The electronic ad can be updated frequently to show changes in price or availability of the goods and/or services. Advantages such as these allow the publication to have greater success in selling its classified ads.

Existing electronic classified advertising systems have thus helped publishers to sell their advertising, sellers to sell their goods and services, and buyers to purchase same. However, existing electronic classified advertising systems such as those using voice messaging systems have some limitations which inhibit their usefulness. Some existing systems utilize a standard voice mailbox interface which requires the buyer to call a telephone number each time he wishes to listen to an ad, be it the same ad or a different ad. These systems also play the ad only once and then require the buyer to leave a message for the seller, hang up or transfer to another mailbox. If the buyer wishes to hear other classified ads listed in the classified advertising publication, she must either wait until after the message prompt (either leaving a message or not) and dial a mailbox number to access each of those ads or, in some systems, he must hang up and call again.

One of the limitations of prior art electronic classified systems is their complexity and lack of flexibility. In general these systems are difficult to use. The easier the system is to use the more it will be used. Prior art methods and systems do not permit a user to manipulate a plurality of selected advertisements by advancing or retreating a predetermined period of time within an advertisement during playback thereof, or pausing and automatically resuming playback of an advertisement. Prior art methods and systems also do not permit a user to playback or skip playback of a subset of the plurality of selected advertisements. Finally, prior art methods and systems also do not provide for playback of such advertisements such that the sound quality thereof approximates that of natural speech without having to separately record each advertisement as a single pre-recorded message.

DISCLOSURE OF INVENTION

Accordingly, it is the principle object of the present invention to provide an improved method and system for manipulating playback of advertisements selected from an electronic classified advertising system.

According to the present invention, then, a method and system are provided for manipulating playback of a plurality of advertisements selected from an electronic classified advertising system. The method of the present invention comprises advancing playback of one of the plurality of advertisements a first predetermined period of time in response to a first user input, and retreating playback of one of the plurality of advertisements a second predetermined period of time in response to a second user input. The method further comprises pausing playback of one of the plurality of advertisements in response to a third user input, and resuming playback of the paused one of the plurality of advertisements upon the expiration of a third predetermined period of time.

The system of the present invention comprises means for advancing playback of one of the plurality of advertisements a first predetermined period of time in response to a first user input, and means for retreating playback of one of the plurality of advertisements a second predetermined period of time in response to a second user input. The system further comprises means for pausing playback of one of the plurality of advertisements in response to a third user input, and means for resuming playback of the paused one of the plurality of advertisements upon the expiration of a third predetermined period of time.

These and other objects, features and advantages will be readily apparent upon consideration of the following detailed description in conjunction with the accompanying drawings.

BRIEF DESCRIPTION OF DRAWINGS

FIGS. 4a–4e are a flow chart illustrating the auto locator interface;

BEST MODE FOR CARRYING OUT THE INVENTION

Figure 1:
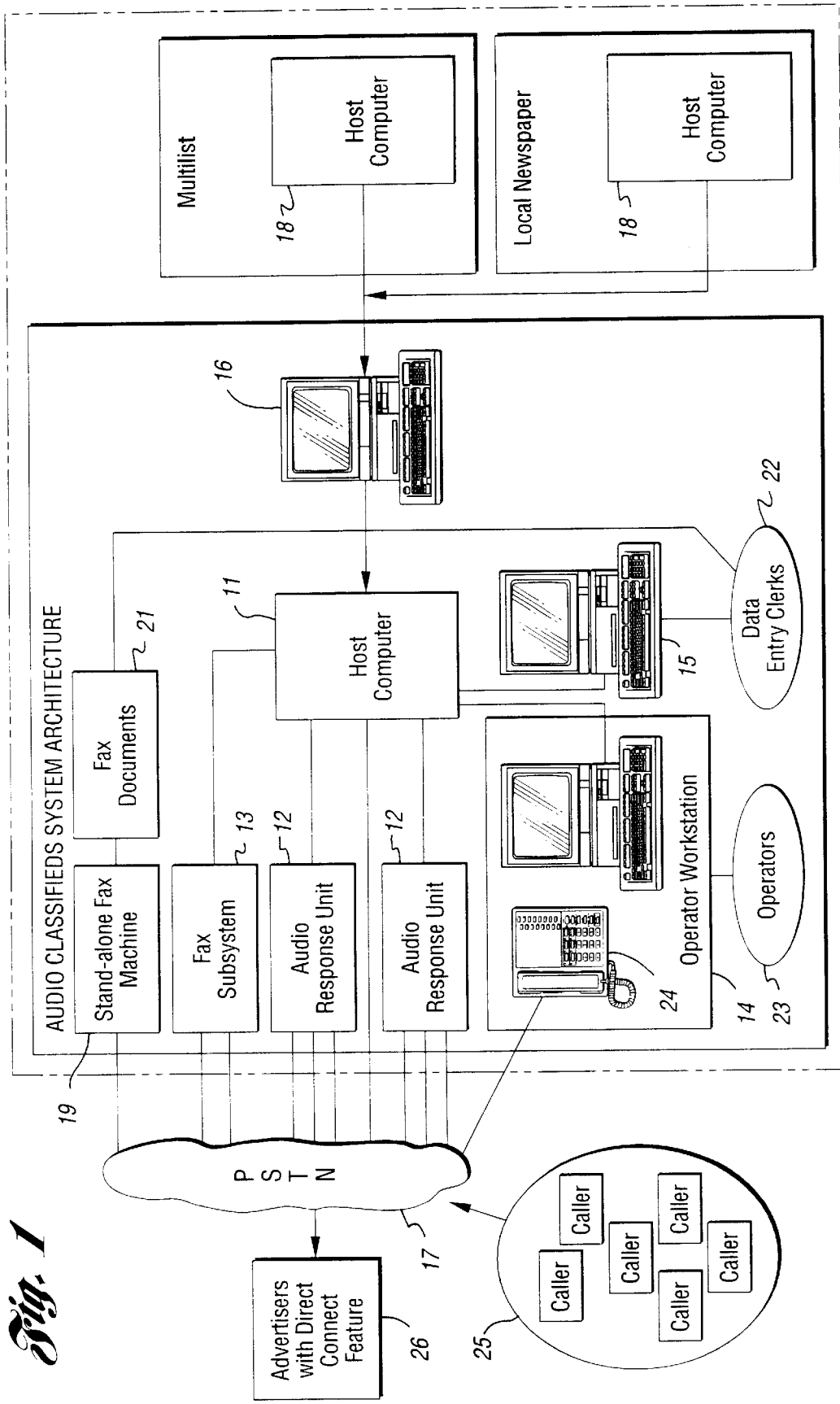
FIG. 1 is a schematic of the system architecture.

Referring now to the figures wherein like reference numerals denote like structure throughout each of the various figures, FIG. 1 illustrates the electronic classified advertising system architecture. Referring to FIG. 1, a host computer 11 is connected to audio response units 12, fax system 13, operator workstation 14, data workstation 15, listing workstation 16, and public switched telephone network (PSTN) 17. A host computer 18 from a service provider such as the multi-list and/or local newspaper is connected to host computer 11. A facsimile (fax) machine 19 for faxing documents 21 is connected to PSTN 17 and is accessible to data clerks 22 at workstation 15. Operators 23 at workstation 14 are connected to PSTN 17 through telephones 24. Users of the system which may include buyers 25 and advertisers 26 access the system through PSTN 17.

In operation, the potential users which may include individual buyers or sellers 25 or larger entities 26 call into the system to either place ads or to access the ads on the system. For example, a seller may call a local newspaper to have an ad entered into host computer 11. Computer 11 stores the ads which may be played to the callers through audio response units 12. Faxes may be sent to the callers by fax machine 19 through PSTN 17. For real estate ads the multilist computer 18 provides the listings and updates them to host computer 11. Operators 23 interface with the callers through telephone 24 and may access the electronic classified system through the PC at workstation 14. Data entry clerks 22 also input information on ads into the system through PC 15 and may send or receive faxes from fax machine 19.

Figure 2:
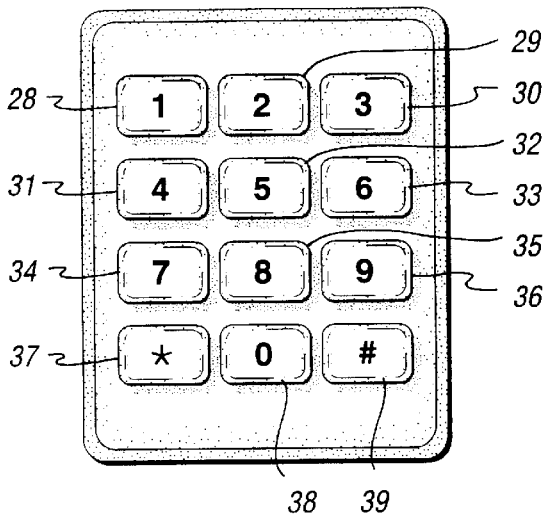
FIG. 2 illustrates a Dual Tone Multi-frequency (DTMF) keypad.

Referring to FIG. 2, a Dual Tone Multi-frequency (DTMF) keypad 27 is shown including keys 28–39 which represent keys 1–9 and the * , 0, and # pound keys. These keys and their use are known in the telephone art. The use of the keys is similar to that for voice messaging systems as is also known in the art.

Figure 3A:
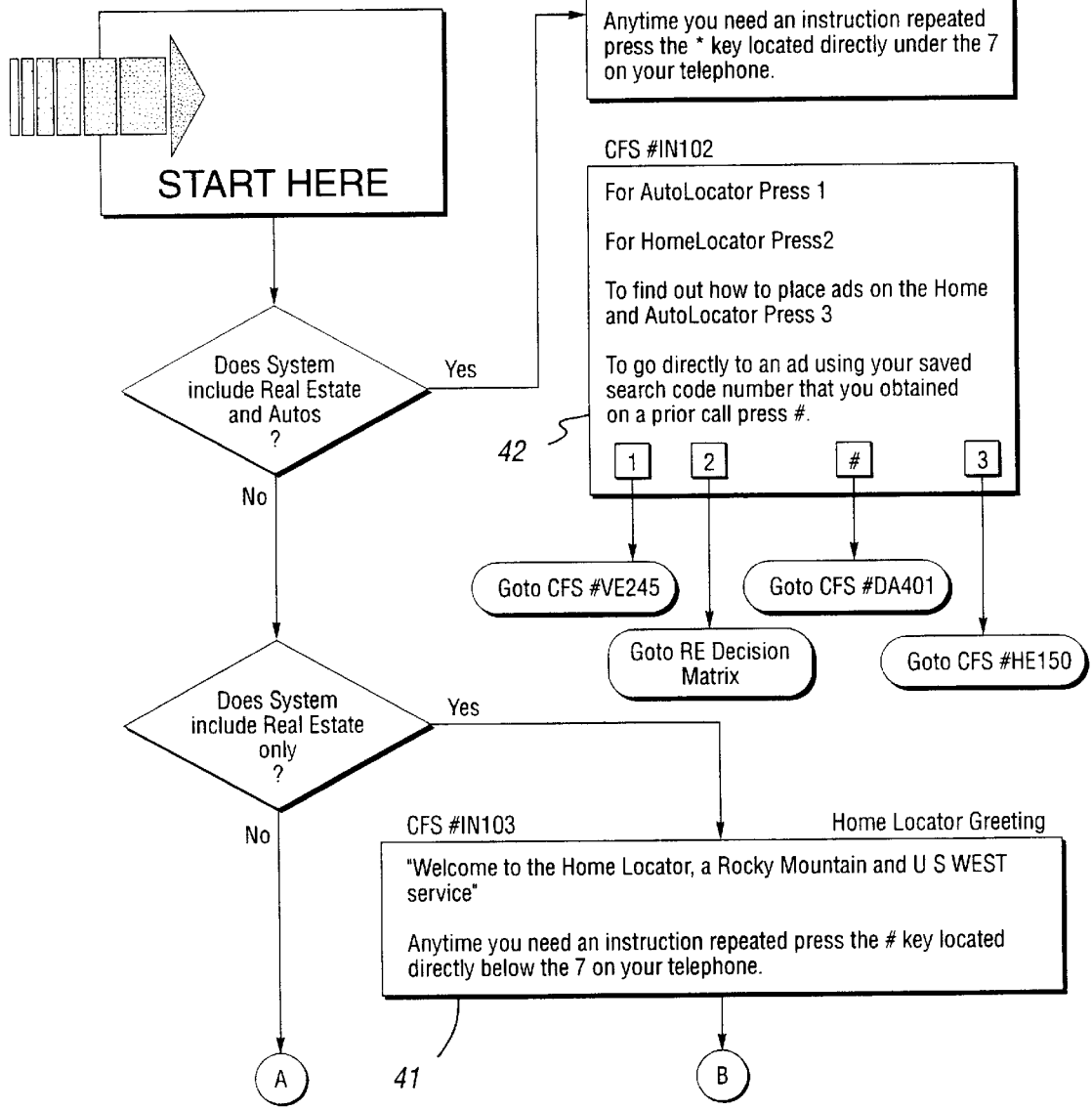
FIGS. 3a–3b are a flow chart illustrating system access interface.
Figure 3B:
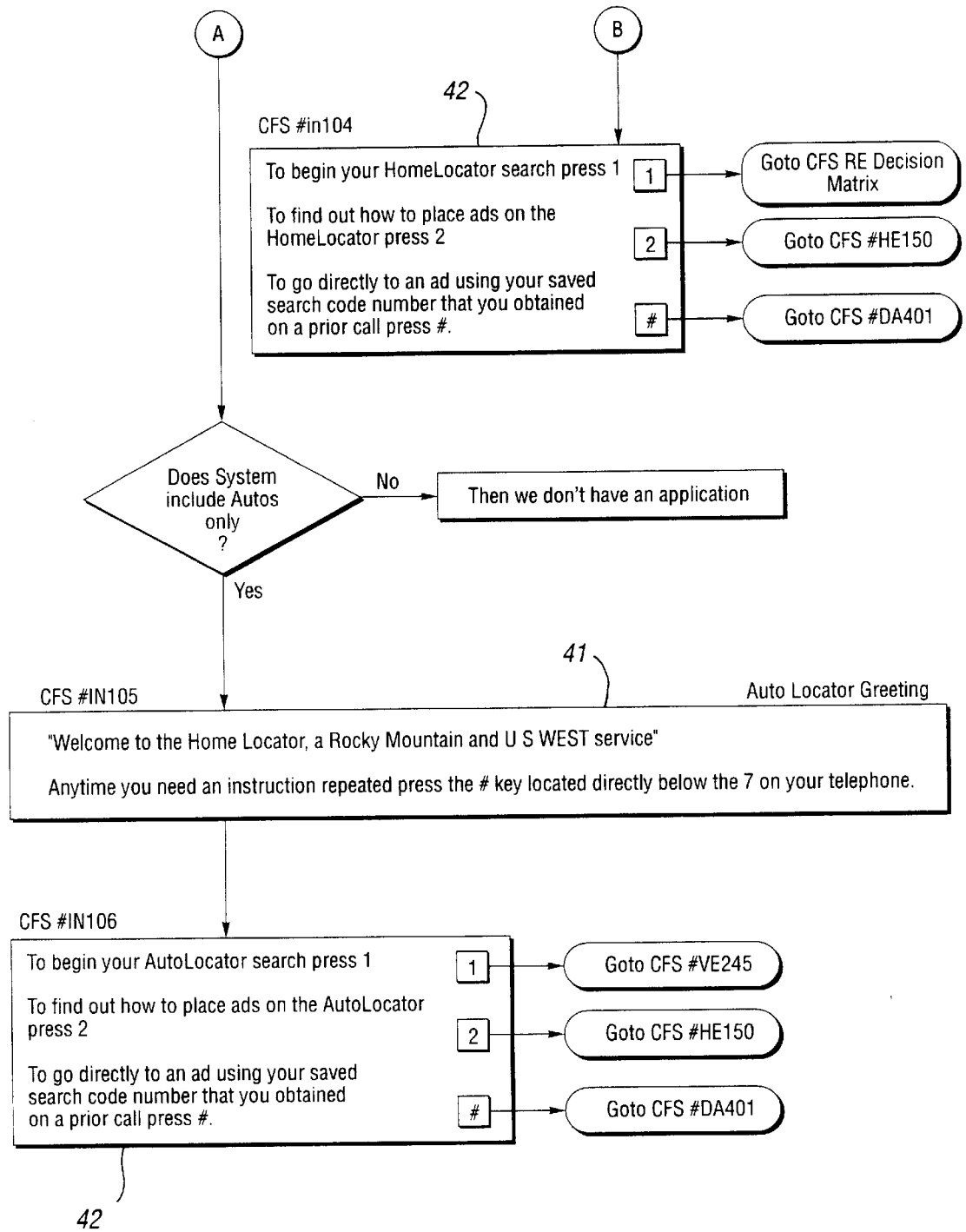
Figure 4A:
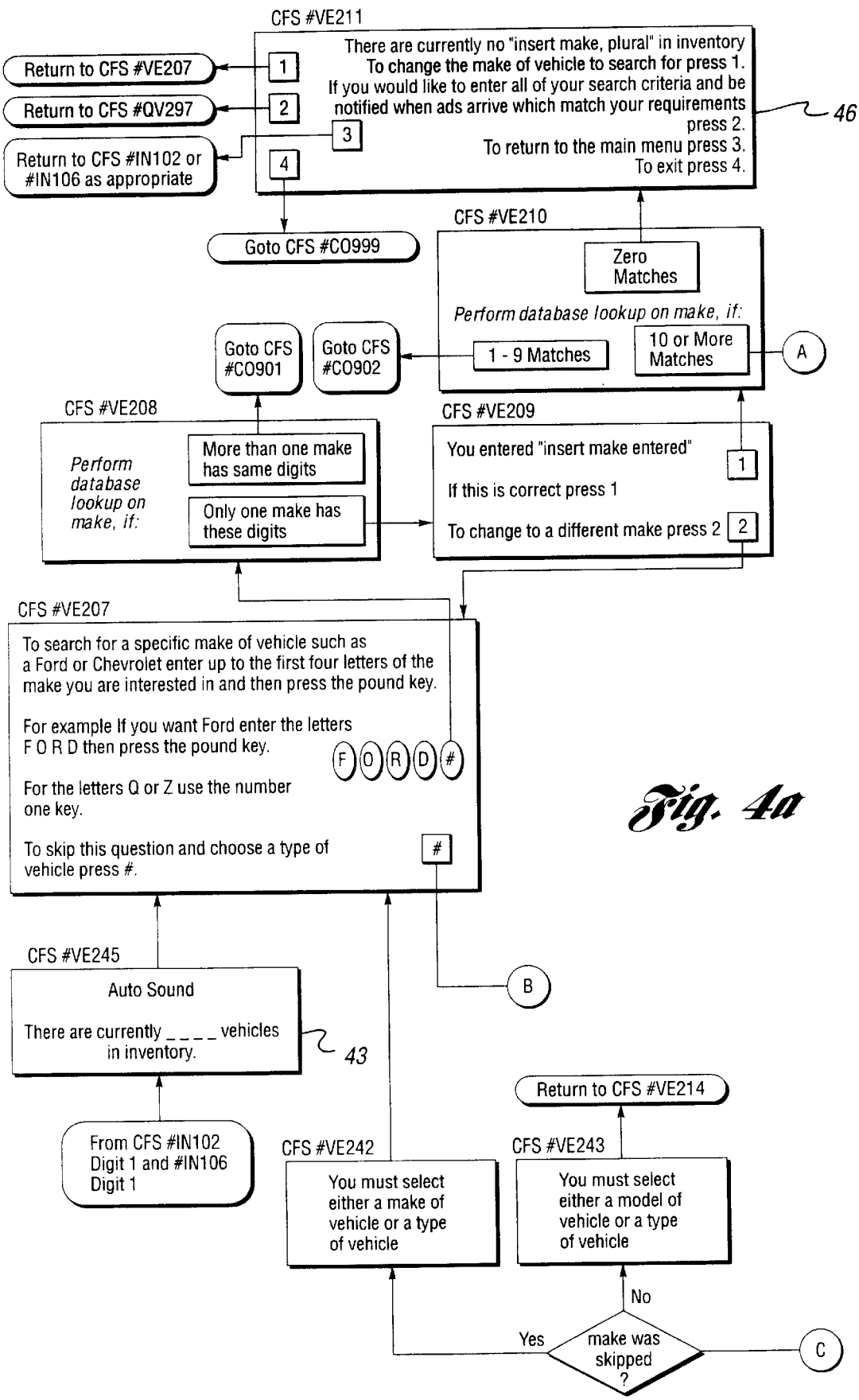
Figure 4B:
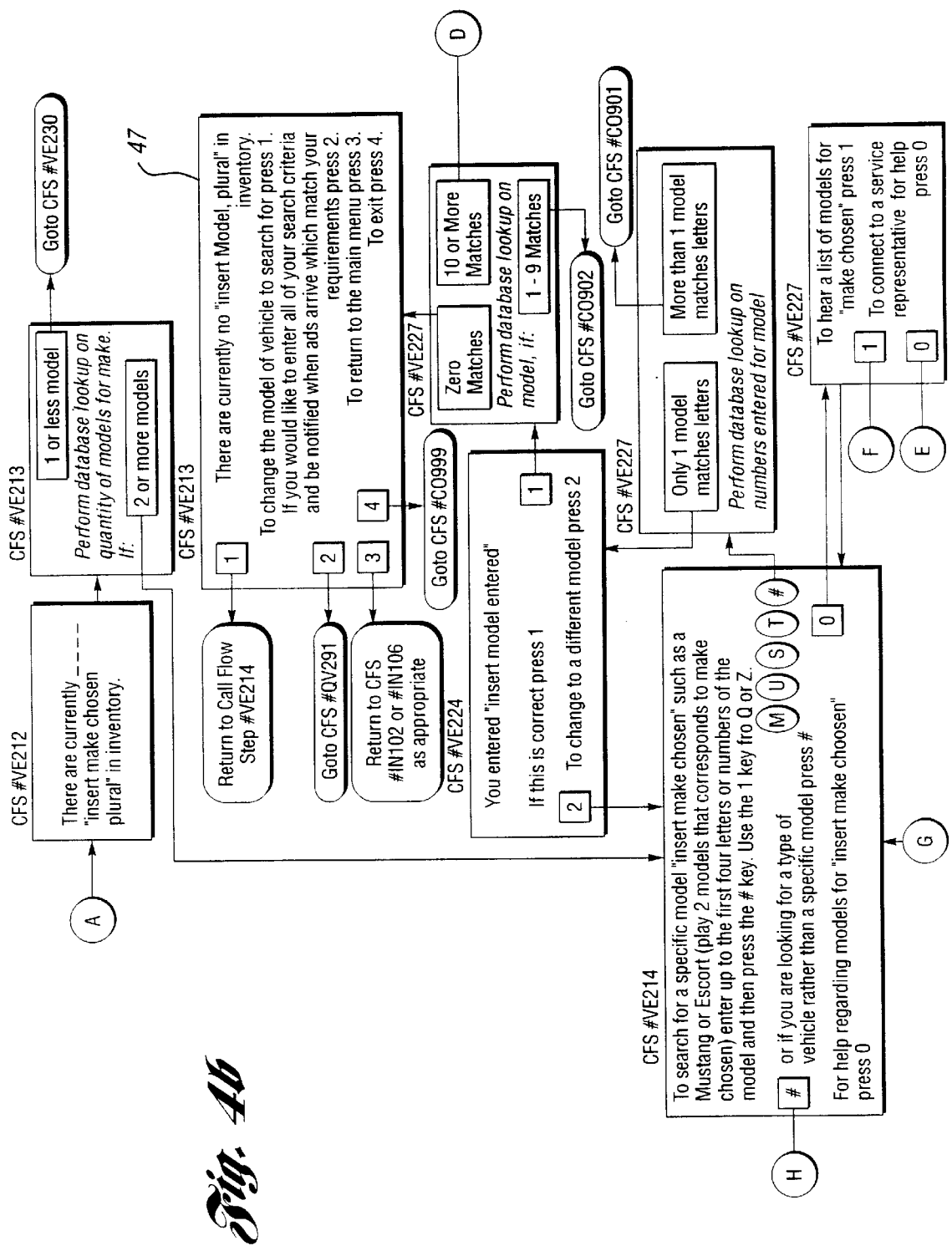
Figure 4D:
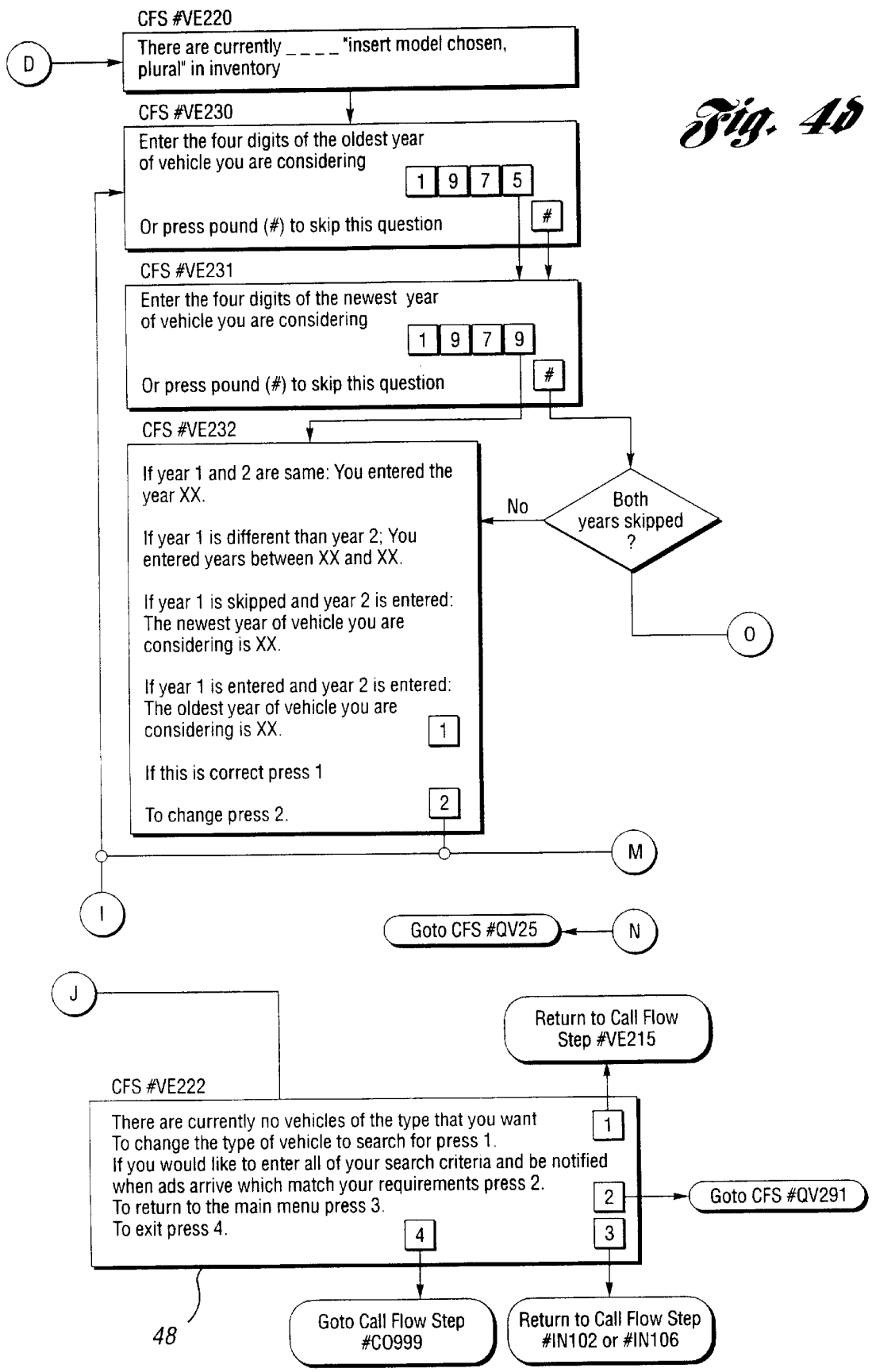
Figure 4E:
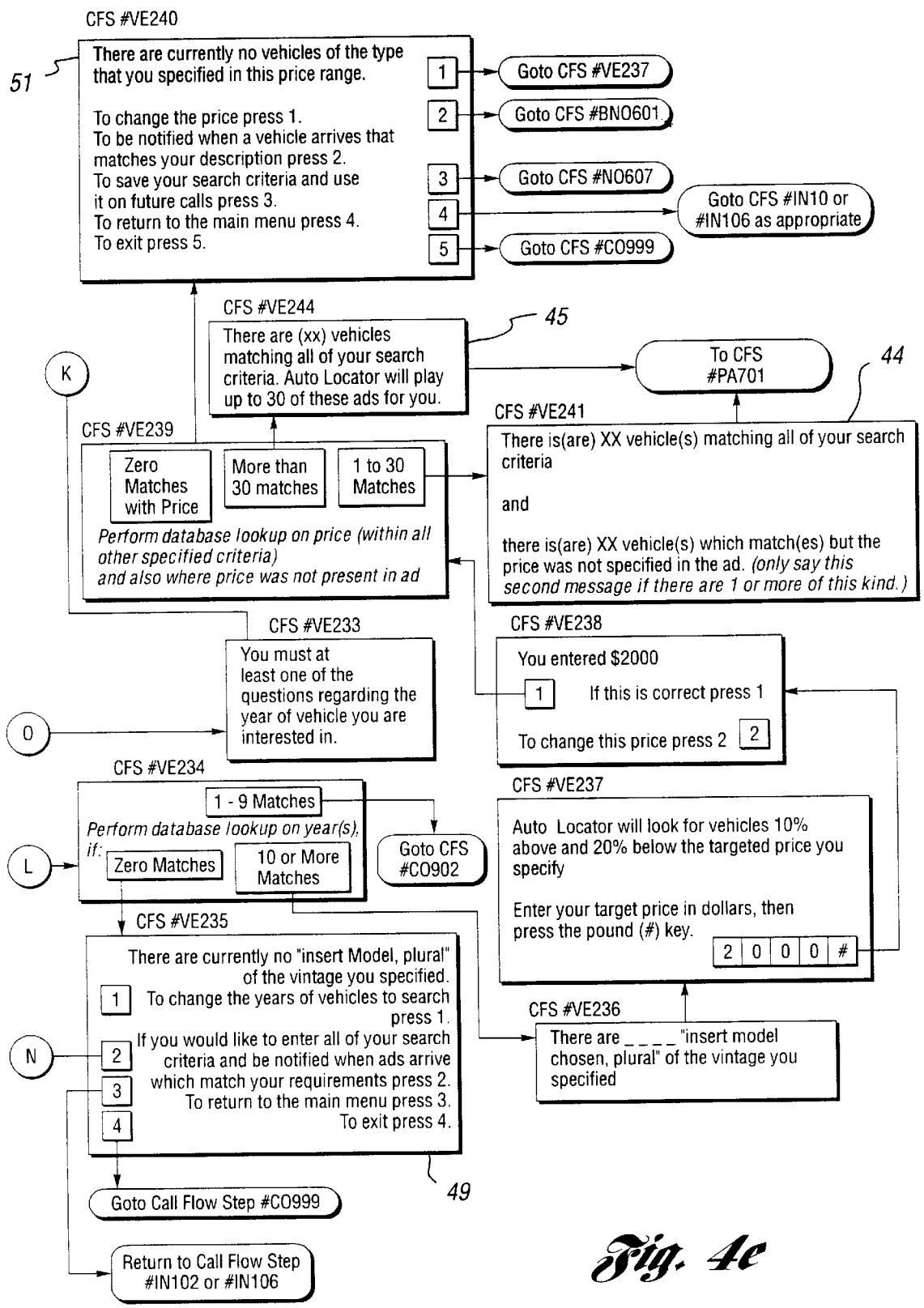

Referring to FIGS. 3a–3b, when a user dials into the system he or she is greeted as is shown in one of boxes 41 depending upon which system is in use. That is, the system may include an auto locator, a home locator, or both. For ease of description herein the system will be described with respect to an auto locator although it may include either or both an auto locator and a home locator interface. The auto locator interface will be used to illustrate the features of the invention although in practice the home locator interface contains the same features. Referring to FIGS. 3a–3b, the user is instructed in step 42 to press a DTMF key in order to access one of the functions in the system. If the user presses DTMF key 1 (28) he is placed into the auto locator system of FIGS. 4a–4e. If the user has previously saved a search on the system and wishes to utilize the saved search criteria she is instructed to press the # key (39) and is then to the direct ad access discussed in FIGS. 7a–7d below.

Referring to FIGS. 4a–4e, the auto locator system begins at step 43 with an indication of the number of vehicles currently in inventory. Most of the rest of the flow chart directs the user to enter specific criteria for locating the type of vehicle he or she desires as is known in the art. This search criteria allows the host computer to search the database to determine if there are any ads which meet the users criteria. If there are one or more ads which meet the search criteria then the user is so advised in steps 44 and 45. The user is then taken to the play ad flow chart (FIGS. 5a–5c) discussed below.

Referring again to FIGS. 4a–4e, if, during the selection of search criteria by the user, no ads meeting the search criteria up to that point are found by the system, then the user is so advised. For example, at step 46, if no ads are in the system which are of the make of automobile desired by the user, then the user is so informed and he is given the opportunity to save the search criteria and be notified when ads arrive which are of the desired automobile make. The user also has the options (in step 58) of saving search criteria and being notified if ads have been successfully retrieved. In order to request this continuous search and notification from the system the user is instructed to press a predetermined key on DTMF keypad 27. In this instance the user is instructed to press key 2 (29, FIG. 2) in order to select this notification option. Similarly, at other points in the search the user is given this notification option. For example, at step 47, if the model selected is not matched by an existing ad, the user may select the notification option. Similarly, for vehicle type in step 48 and for vehicle vintage in step 49 the user is given the notification option.

The final search criteria is price and if no match is found then the user is given the option to save the entire search in step 51 and to be notified when a vehicle ad is entered that meets all of the search criteria. When the user selects the notification option at any point in the search he is taken to the notification flow chart menu in FIG. 6 discussed below.

Figure 5A:
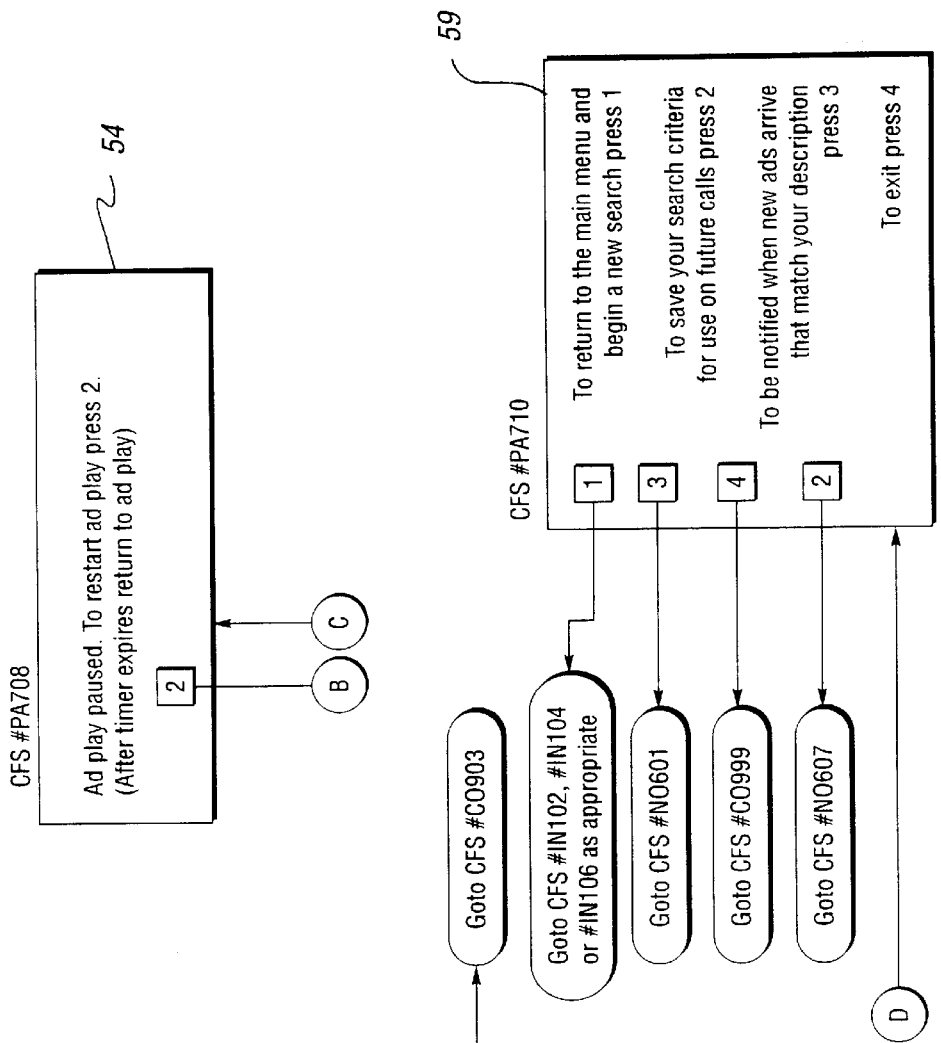
FIGS. 5a–5c are a flow chart illustrating the play advertisements interface.
Figure 5A:
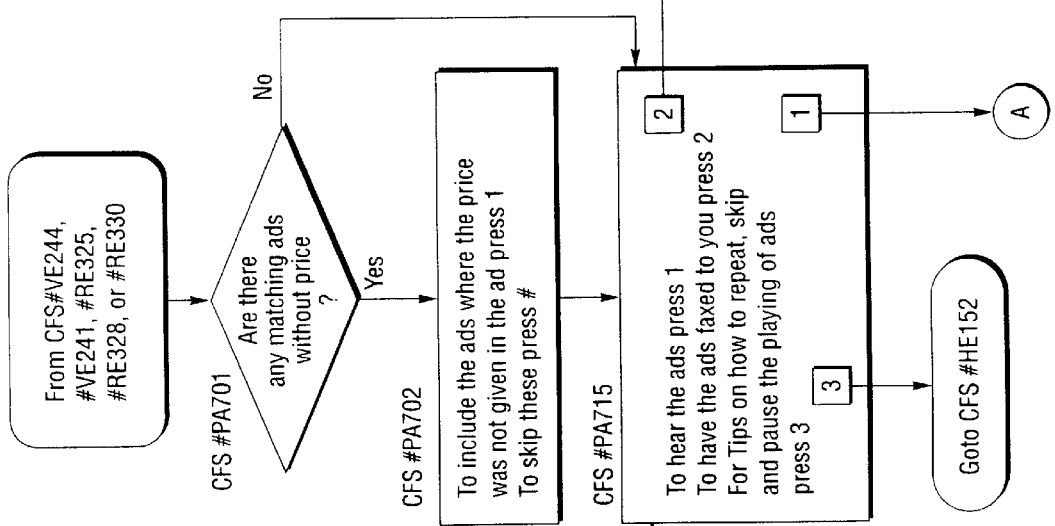
Figure 5B:
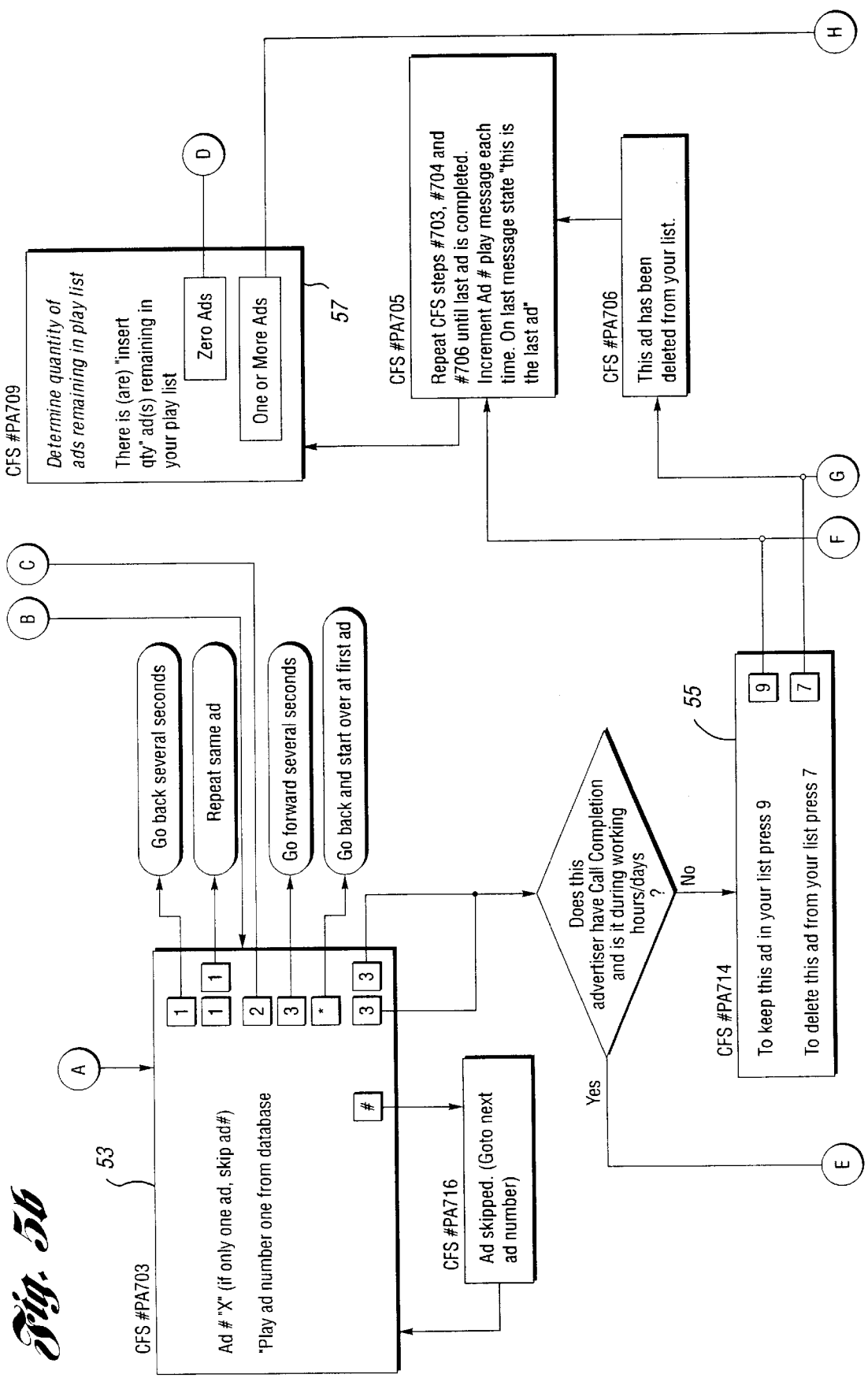
Figure 5C:
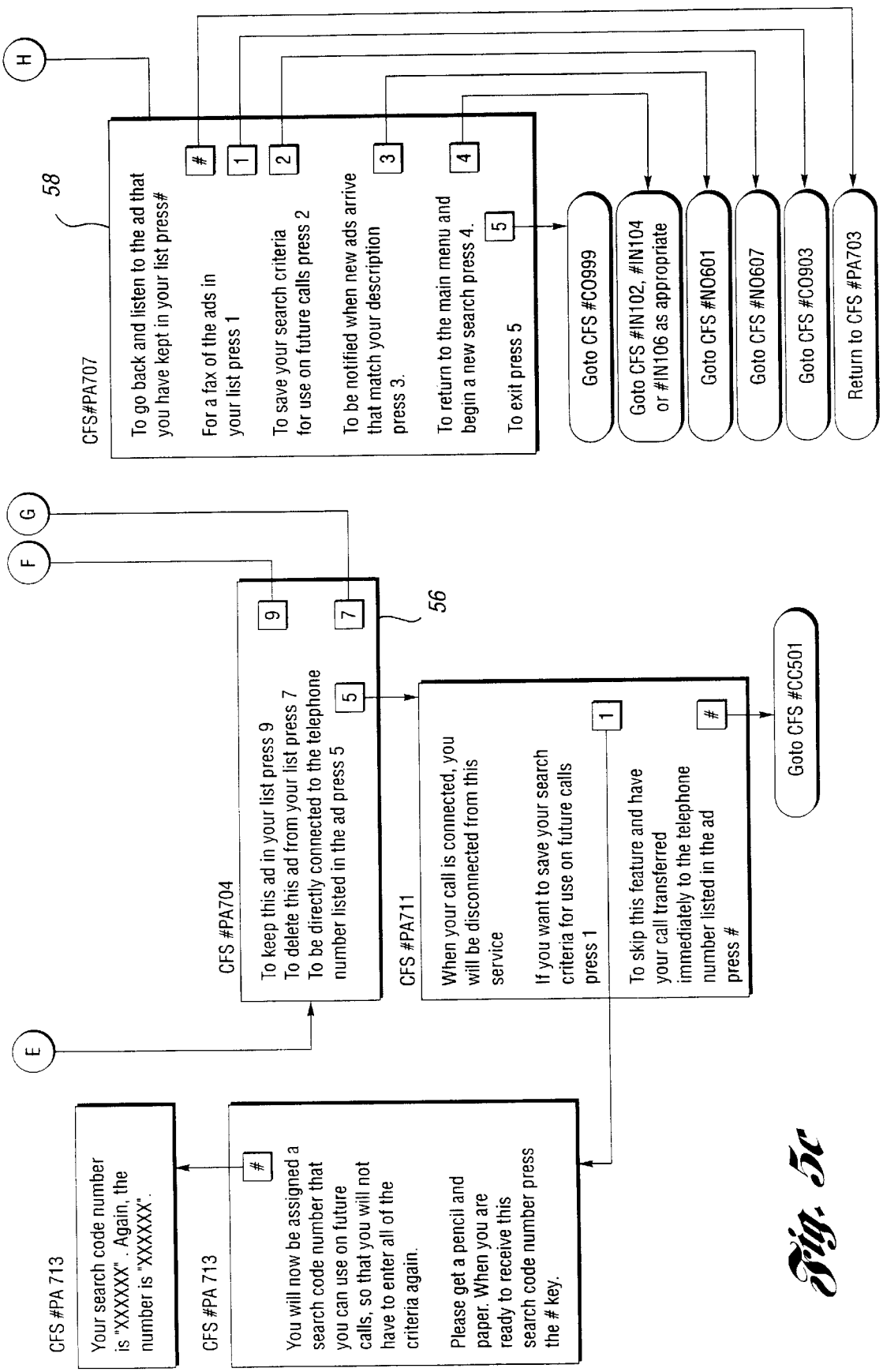

Referring to FIGS. 5a–5c, the flow chart illustrating the interface to allow the user to play advertisements which he has selected or which meet her criteria is illustrated. That is, if the user criteria matches an ad in steps 44 or 45 of FIGS. 4a–4e, then the user may play back the actual ads by interfacing with the system as shown in FIGS. 5a–5c. The instructions in step 52 of FIGS. 5a–5c instruct the user to press key 1 (28, FIG. 2) in order to hear the ads. By pressing the designated DTMF keys as listed in step 53, the user may control playback functions such as deleting, saving, skipping forward or backward in the ad and pausing the ad.

For example, by pressing key 1 (28) the user can skip backward a few seconds in the ad, or any predetermined period of time, to hear a particular passage again. By pressing key 1 twice the user can repeat the entire ad. By pressing 2 (29) the user can pause the ad as shown in step 54 and then restart it either by pressing 2 again. Alternatively, the system will restart the ad automatically after a predetermined time to prevent a permanent pause condition by a user. If the user elects to press 3 (30) in step 53 the ad will fast forward or skip a few seconds, or any predetermined period of time. If the user elects to press the star key (37) then the system will return to the first ad on the list and begin replay. If the user presses the # key (39) the current ad is skipped and the next ad on the list is played. The method and system of the present invention may also be configured so that the user can playback or skip playback of a subset of the ads on the list by pressing a selected key or combination of keys from DTMF keypad 27.

If, in step 53 the user elects to press the 3 key (30) twice, then she is taken to steps 55 or 56 depending upon whether the advertiser has a direct connect feature. In either step 55 or 56 the user is instructed to press key 9 (36) to save the ad or key 7 (34) to delete the ad from the list of ads. If the advertiser has a direct connect feature the user is instructed to press 5 (32) in step 56 to be automatically connected to the advertiser.

Figure 6:
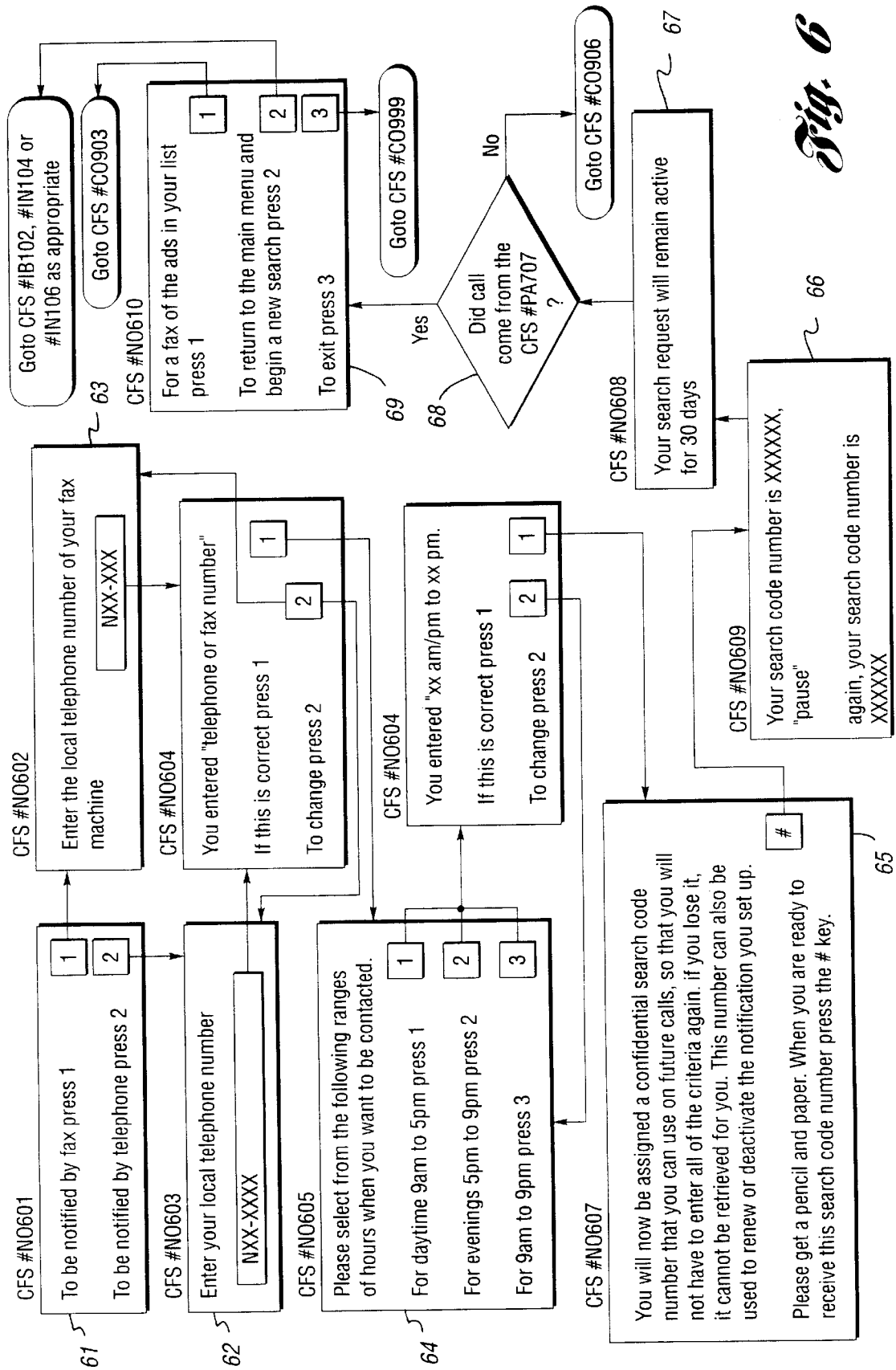
FIG. 6 is a flow chart illustrating the notification interface.
Figure 7A:
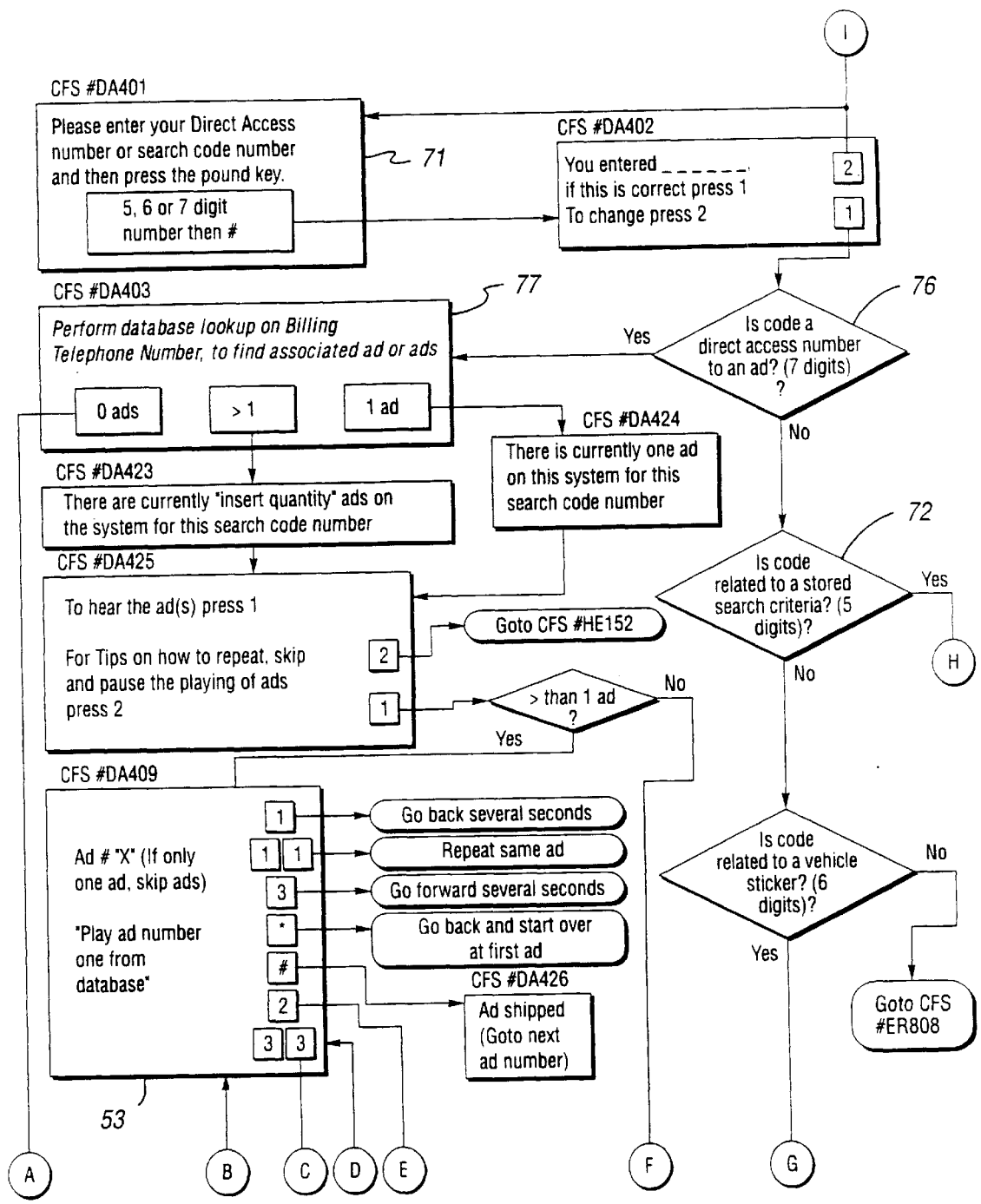
FIGS. 7a–7d are a flow chart illustrating the direct ad access interface.
Figure 7B:
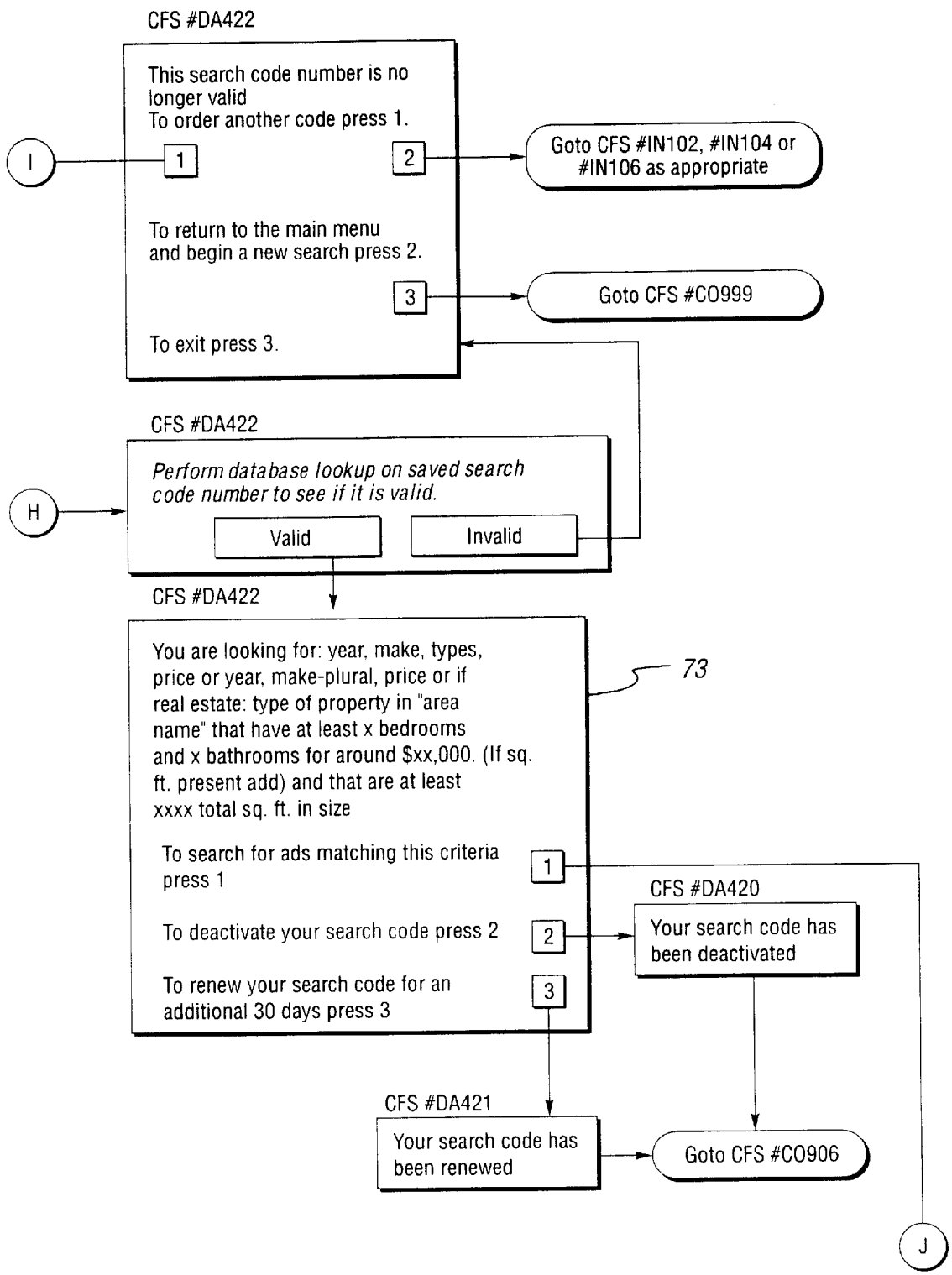
Figure 7C:
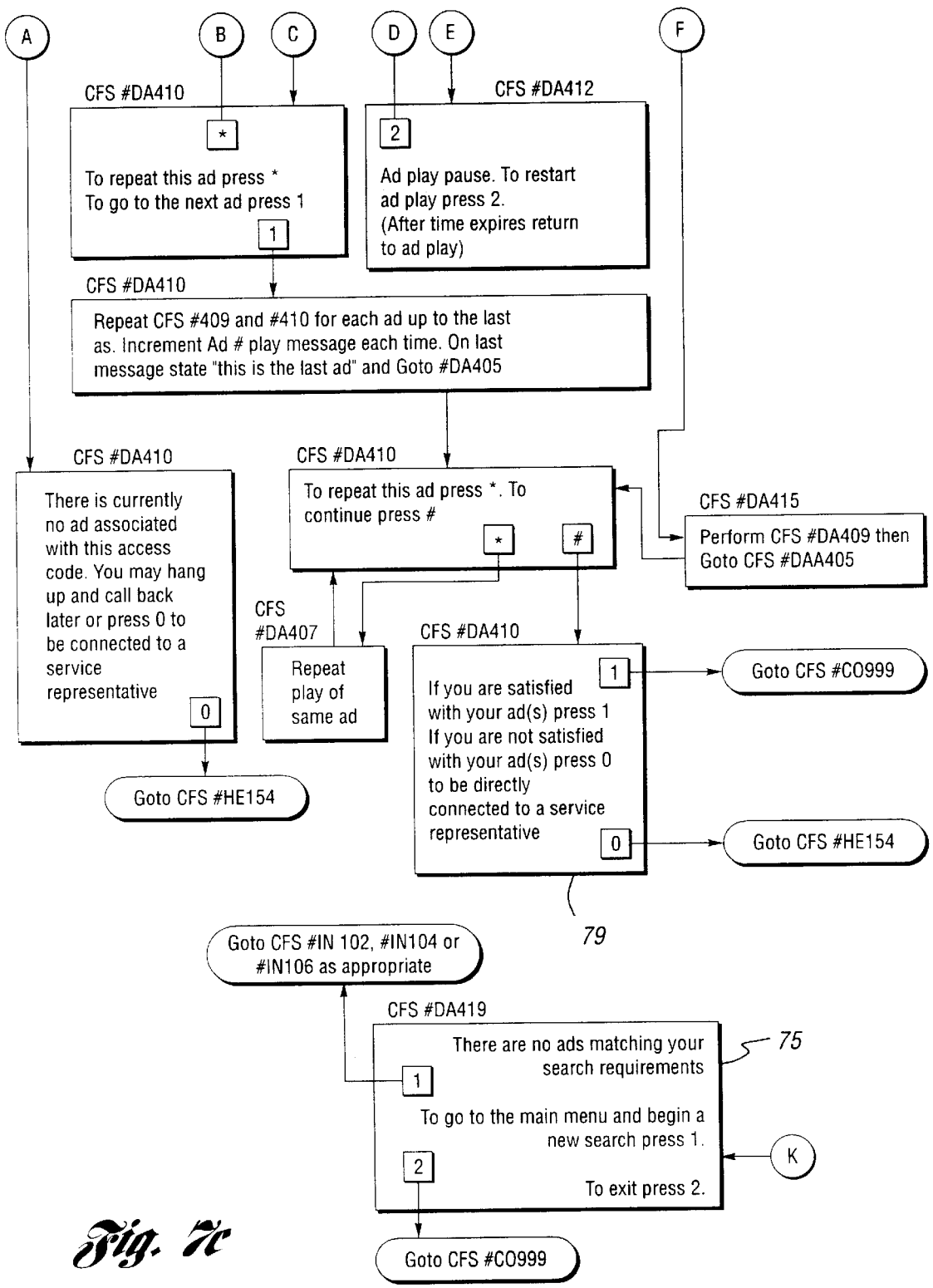
Figure 7V:
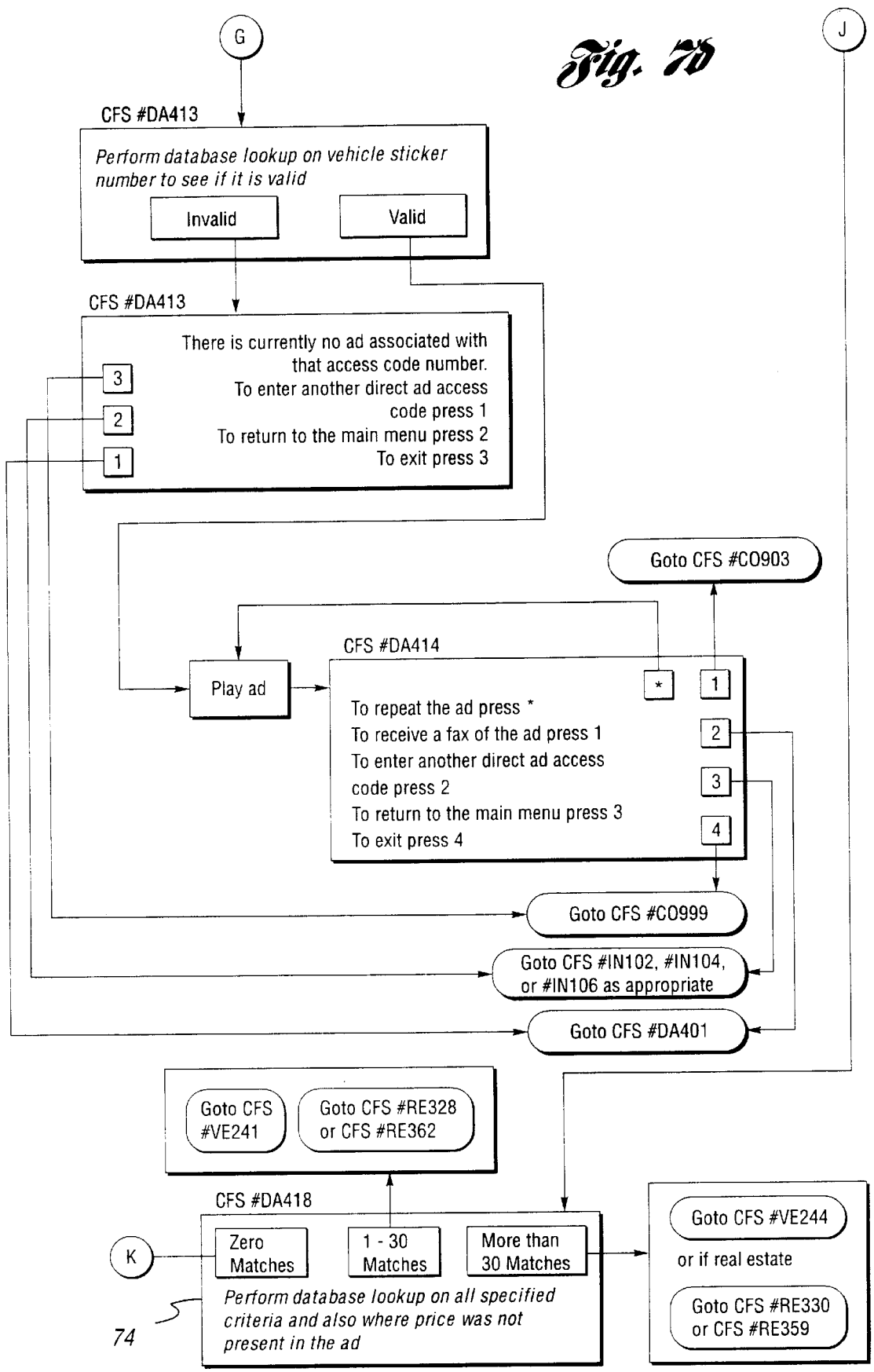

After the ads in the play list have been heard the user is advised of the number of ads in the list in step 57. By following the prompts in step 58, the user may then elect to hear the ads again or to begin a new search, to save the existing search, to receive a fax of the ads or to be notified when a new ad arrives in the system which meets the search criteria of the current search as in steps 46–48 and 51. If the notification option is elected then the user is taken to the notification menu (FIG. 6).

As is readily apparent from the foregoing discussion, the ads selected by the user are played back over a telephone. To avoid having to record each advertisement separately as a single pre-recorded message, the ads are recorded using concatenated speech. To enhance playback so that the sound quality of the ads approximates that of natural speech, the concatenated speech used for recording purposes has a tempo of approximately 2.5 to 3 words per second and an interval of approximately 0.1 second between words and sentences. For the same reason, the recorded ads are provided with natural speech inflections such as a downward inflection at an end of a sentence punctuated by a period, and an upward inflection at an end of a sentence punctuated by an exclamation.

Moreover, the ads are edited with a resolution of approximately 0.01 second, again so that the sound quality of the advertisements during playback approximates that of natural speech. In such a fashion, playback of the advertisement has a sound quality approaching that of a single prerecorded message without having to separately record each advertisement as such. Finally, where there is more than one ad in the play list, the voice used to deliver each ad preferably alternates between a male and a female voice from one ad to the next.

According to the present invention, creation of a scripted advertisement is also automated. In that regard, advertisement text transmitted by a provider to the electronic classified advertising system host computer 11 is parsed thereby to extract known words and phrases. The resulting ad data is analyzed to determine the availability of data to fulfill the ad search and ad play requirements of the electronic classified advertising system.

If proper ad search and ad play data are available, the advertisement is then constructed using scripting rules which classify the available data as essential or non-essential. Essential data must be present and recognizable for every essential category or the ad is rejected. Non-essential data that is not present or recognizable is dropped from the construction of the ad.

Rejected ads are categorized by type of problem and made available for review and correction. The electronic classified advertising system performs key word searches of vocabulary available on the system for all data categories. In such a fashion, the electronic classified advertising system will suggest alternative words or phrases which may be substituted for words or phrases from the original ad text.

Unrecognizable words and phrases are logged and analyzed to determine whether they should be added to the system vocabulary for future use in ad construction (e.g., the word/phrase appears frequently and is necessary for good ad play), added to the system vocabulary for future reference in ad construction (e.g., the word/phrase appears frequently but is not necessary for good ad play), or mapped to already available system vocabulary (e.g., a synonym or abbreviation). Each word/phrase in the system vocabulary is tracked both as to when it was first made available and as to usage. Those words/phrases that have been available in the system vocabulary for a long period of time but have not often been used may be deleted or archived for more efficient storage.

Successfully scripted ads are processed to assign the correct voice files to each so that they may be properly voiced by the electronic classified advertising system. The result is transmitted to an audio response unit so that the ad can be accessed by users of the electronic classified advertising system. Advertisements are added to the system in such a fashion periodically, preferably once each hour. For performance monitoring, ad data is also stored in its original format and statistics are kept on all aspects of ad processing including quantity of ads received, quantity of ads processed, as well as quantity of ads rejected and reasons therefor. The foregoing description regarding the creation of advertisements, including the scripting and recording thereof, is discussed in greater detail in U.S. patent application Ser. No. 08/584,414, filed Jan. 8, 1996, now Pat. No. 5,832,432 entitled "Method For Converting A Text Classified Ad To A Natural Sounding Audio Ad", filed concurrently with and assigned to the assignee of the present application, the contents of which are hereby incorporated by reference.

Referring to FIG. 6, the user is instructed at step 61 to select notification by fax or telephone. The user then enters the telephone or fax numbers as instructed in steps 62 and 63. In step 64 the user is given the option to select the time of day during which he wishes to receive the notification. In step 65 the user is advised that a search code will be assigned and it is assigned in step 66. Step 67 advises the user that the search will be saved for a predetermined time. Referring to FIGS. 4a–4e, it should be noted that, in step 51, if a user elects to save a search she is taken directly to step 65. In step 68 the system determines whether the user has listened to the ad(s) through the steps in FIGS. 5a–5c and if the user has been through step 58. If so, then the search is saved and the user is prompted in step 69 to press the appropriate key to receive a fax of the ads, to return to the main menu or to exit the system. If the user has come from some other step in the system such as step 51, then she is instructed to press a key to either exit the system or to return to the main menu of FIGS. 3a–3b. If the user returns to FIGS. 3a–3b then she is taken to one of steps 42 depending upon whether the system includes an auto or home system or both. As stated above the choice of an auto or home locator system is a matter of design choice and other items or services may be offered using the claimed system without departing from the scope of the invention.

Referring to FIGS. 7a–7d, if a user has selected a saved search function by pressing the # key (39) in FIGS. 3a–3b (step 42) then the system requests the search code to be entered in step 71. If the search code is for a saved search as determined by the system in step 72 then the system will repeat the saved search criteria in step 73 and request the user to press the appropriate key to search for ads matching the criteria or to remove the search or to renew the search code for an additional period of time. If the user elects to search then the system performs the search and the user is advised of the results and returned to steps 44 or 45 in FIGS. 4a–4e depending upon the number of matches found. If no matches are found then the user is so advised in step 75 and given the option to return to the main menu (FIGS. 3a–3b) or to exit the system.

A unique feature of the present invention allows the advertiser to directly access all of his ads on the system. The advertiser may wish to directly access the ad(s) to check for mistakes in the ad or to hear how the ad sounds. The advertiser will be given its direct ad access number (billing number) upon entering the ad in the system by one of the operators 23, data clerks 22 or other system personnel. If the system determines in step 76 that the entered code is a direct ad access, then the system will search for all of the ads which that advertiser has on the system in step 77. The advertiser will then be given the same options in replaying the ad(s) that the user was given in step 53 of FIGS. 5a–5c with minor differences. That is, if the advertiser presses the # (39) key, she is queried whether the ad is satisfactory at step 79. This query is repeated after each ad is heard. If the ad is not satisfactory the advertiser is connected to a service representative 22 or 23 by pressing 0 (38). If the ad is satisfactory then the advertiser presses key 1 (28) and the next ad is played or, if this is the last ad, then the advertiser is taken to system exit.

Figure 8:
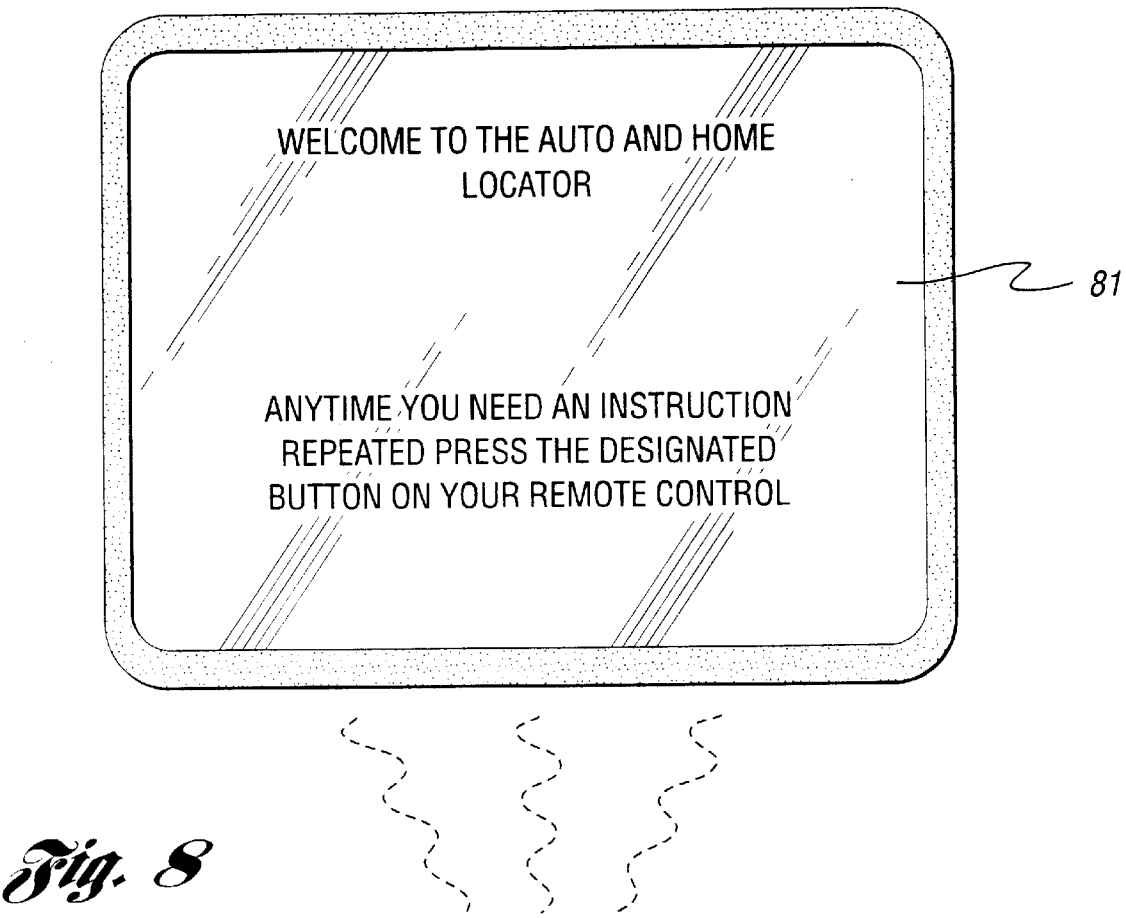
FIG. 8 is a schematic of an interactive television application of the invention.
Figure 8:
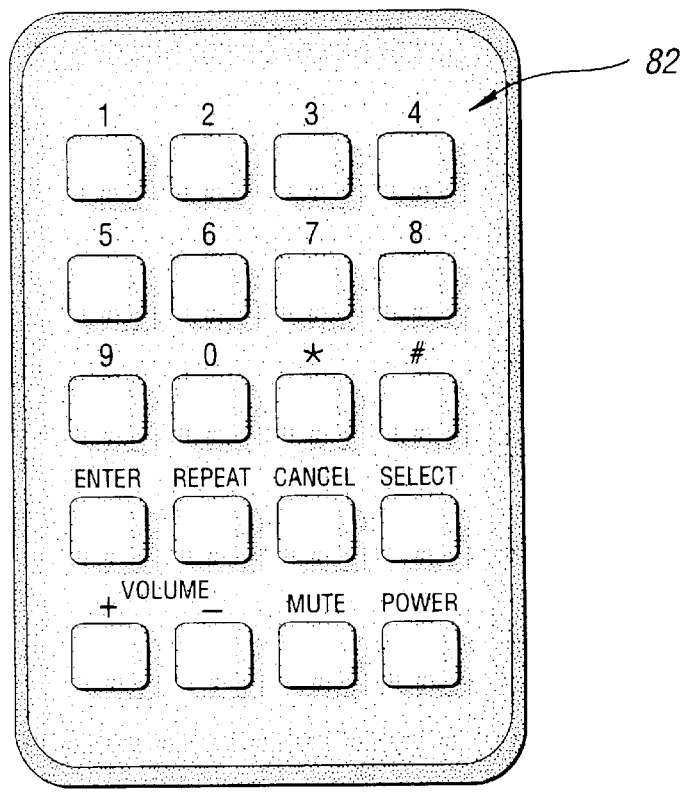

The invention has been disclosed with respect to a preferred embodiment thereof. However, it is not to be so limited as changes and modifications may be made which are within the full intended scope of the invention as defined by the claims. For example, while an auto and home interface have ben described, the invention may be used for other goods and services such as furniture, appliances, sporting goods etc. In addition, while the invention has been described with respect to a telephone interface it is equally applicable to other media. Referring to FIG. 8, the interface could be provided using a television screen 81 with the remote control buttons 82 serving the same function as the DTMF keypad 27. Interface instructions could be supplied audibly as with the telephone interface or visually on the television screen. The ads could then be displayed on the television screen.

As is readily apparent from the foregoing description, then, the present invention provides an improved method and system for manipulating playback of a plurality of advertisements selected from an electronic classified advertising system. More specifically, the present invention provides a method and system whereby a user may manipulate a plurality of selected advertisements by advancing or retreating a predetermined period of time within an advertisement during playback thereof, or pausing and automatically resuming playback of an advertisement.

The present invention also provides a method and system whereby a user may playback or skip playback of a subset of the plurality of selected advertisements. Moreover, the present invention further provides a method and system whereby playback of such advertisements has a sound quality approximating that of natural speech.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

We claim:

1. In an electronic classified advertising system, a method for manipulating playback of and responding to a plurality of advertisements selected from the system, each advertisement associated with an advertiser and delivered to a user over a telephone, the method comprising:

playing a message indicating the number of advertisements selected;

advancing playback of one of the plurality of advertisements a first predetermined period of time in response to a first user input;

retreating playback of one of the plurality of advertisements a second predetermined period of time in response to a second user input;

pausing playback of one of the plurality of advertisements in response to a third user input;

resuming playback of the paused one of the plurality of advertisements upon expiration of a third predetermined period of time;

repeating playback of a user selected first subset of the plurality of advertisements in response to a fourth user input, wherein the first subset is less than the number of advertisements;

skipping playback of a user selected second subset of the plurality of advertisements in response to a fifth user input, wherein the second subset is less than the number of advertisements; and directly connecting the user, via the telephone, to the advertiser associated with one of the plurality of advertisements in response to a sixth user input when a predetermined time of day requirement is satisfied.

2. The method of claim 1 further comprising repeating playback of the plurality of advertisements in response to a fifth user input.

3. The method of claim 1 further comprising skipping playback of one of the plurality of advertisements in response to a sixth user input.

4. The method of claim 1 wherein the first and second predetermined periods of time are equal.

5. In an electronic classified advertising system, a system for manipulating playback of and responding to a plurality of advertisements selected from the advertising system, each advertisement associated with an advertiser and delivered to a user over a telephone, the system comprising:

means for playing a message indicating the number of advertisements selected;

means for advancing playback of one of the plurality of advertisements a first predetermined period of time in response to a first user input;

means for retreating playback of one of the plurality of advertisements a second predetermined period of time in response to a second user input;

means for pausing playback of one of the plurality of advertisements in response to a third user input;

means for resuming playback of the paused one of the plurality of advertisements upon expiration of a third predetermined period of time;

means for repeating playback of a user selected first subset of the plurality of advertisements in response to a fourth user input, wherein the first subset is less than the number of advertisements;

means for skipping playback of a user selected second subset of the plurality of advertisements in response to a fifth user input, wherein the second subset is less than the number of advertisements; and means for directly connecting the user, via the telephone, to the advertiser associated with one of the plurality of advertisements in response to a sixth user input when a predetermined time of day requirement is satisfied.

6. The system of claim 5 further comprising means for repeating playback of the plurality of advertisements in response to a fifth user input.

7. The system of claim 5 further comprising means for skipping playback of one of the plurality of advertisements in response to a sixth user input.

8. The system of claim 5 wherein the first and second predetermined periods of time are equal.

* * * * *